March 23, 1926.
D. LOPEZ
1,578,150
METHOD OF MANUFACTURING ARSENATES
Filed May 2, 1924
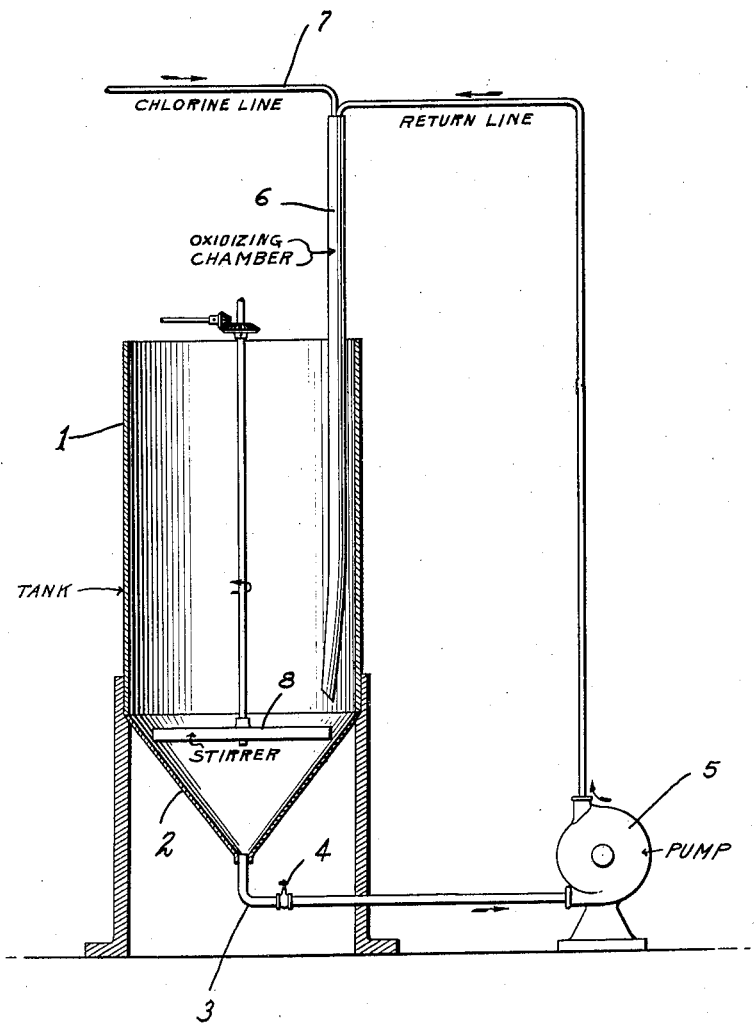

Patented Mar. 23, 1926.

1,578,150

UNITED STATES PATENT OFFICE.

DOMINGO LOPEZ, OF ST. ALBANS, WEST VIRGINIA.

METHOD OF MANUFACTURING ARSENATES.

Application filed May 2, 1924. Serial No. 710,608.

*To all whom it may concern:*

Be it known that I, DOMINGO LOPEZ, a citizen of the Republic of Mexico, and a resident of St. Albans, in the county of Kanawha and State of West Virginia, have invented a certain new and useful Improved Method of Manufacturing Arsenates, of which the following is a specification.

My invention relates to the manufacture of insecticides under the form of alkaline earth, insoluble arsenates such as calcium arsenates, magnesium arsenates, barium arsenates and strontium arsenates, and while calcium arsenate will be referred to specifically hereinafter, it is to be understood that such reference is intended to cover other alkaline earth arsenates as well.

One of the objects of my invention is the provision of a method of manufacturing arsenates by which the use of arsenic acid in any of its forms is eliminated. Likewise the use of soluble alkaline arsenates obtained by the action of arsenic acid on caustic soda or potash or on the corresponding acid or basic carbonates is eliminated.

A further object of the invention is the provision of an improved method of manufacturing arsenates in which the arsenious oxide and the alkalies employed do not lose their physical and chemical properties, although intimately mixed, until they are converted into the tricalcium arsenate.

A further object of the invention is the provision of a method such as above outlined in which the heat evolved during the reaction accelerates the oxidation and reduces the formation of soluble arsenates to a minimum.

A still further object of the invention is the provision of a method in which the lightness and fluffiness of the product produced thereby is increased, a desideratum in the manufacture of such materials.

Various forms of apparatus may be employed in the practice of my improved method, one form being shown in the accompanying drawing.

Referring to the drawing in detail, 1 designates a vertical, cylindrical iron tank which is open at the top and provided with a conical bottom 2. At the lowest point in the bottom of the tank I connect a pipe 3 controlled by valve 4 and leading to the intake side of a centrifugal pump 5. The discharge side of the pump leads to an oxidizing chamber 6 extending in the open top of tank 1. Chlorine is supplied to the oxidizing chamber through pipe 7.

In operation the batch is made up of milk of lime slurry containing about 8% calcium hydroxide, $Ca(OH)_2$, for each 100 parts by weight of arsenious oxide to be added. If desired, magnesium hydroxide may be substituted for the calcium hydroxide. On the basis of 185 parts by weight of hydroxide of lime or other alkaline earth hydroxide mentioned, about 2,127 parts of water are required to form the slurry. The slurry is preferably brought to a temperature of from 30° to 50° C., and of the 185 parts of calcium hydroxide used, about 20 parts should be freshly precipitated. As an alternative, an equivalent proportion of a mixture of calcium carbonate and calcium hydroxide or a mixture of magnesium hydroxide and magnesium carbonate may be employed, the carbonates not hindering the reaction nor interfering with the quality of the product.

The stirrer 8, mechanically driven, moves the contents of the tank in a horizontal plane. The centrifugal pump 5 now circulates the slurry, and with the slurry circulating I add arsenious oxide substantially in the proportion above mentioned, and when this addition is completed, chlorine gas as an oxidizer is fed into the oxidizing chamber 6 through the chlorine line 7, where a lively reaction takes place, evolving enough heat to cause a rapid transformation up to the tri-calcium arsenate state, avoiding almost completely the formation of water-soluble arsenate.

When the oxidation is completed, milk of lime (in the case of calcium arsenate) is added in order to reduce the total percentage of $As_2O_5$ to the percentage required by the Government specifications. The amount of lime added may vary but is generally a little less than four-tenths ($\frac{4}{10}$) of the amount used preparatory to oxidation.

I find that the product resulting from the working of the process above described is very light and fluffy and possesses the killing power required by the Government standard.

The subject matter of the present application is disclosed but not claimed in my copending application, Serial No. 626,159, filed March 19, 1923.

What I claim is:—

1. The method of making an insoluble alkali earth metal arsenate, which method consists in contacting chlorine gas as an oxidizer with a mixture of arsenious oxide and an alkali earth metal hydroxide while the mixture is suspended in warm water, not less than five per cent of the alkali earth metal hydroxide being freshly precipitated.

2. The process of producing an insoluble calcium arsenate of a light and fluffy nature, which process consists in contacting chlorine gas in an oxidizing chamber with a mixture of arsenious oxide and calcium hydroxide, not less than five per cent of the calcium hydroxide being freshly precipitated, while the mixture is suspended in warm water.

3. The process of producing an insoluble calcium arsenate, which process consists in contacting chlorine gas in an oxidizing chamber with a mixture of calcium carbonate and calcium hydroxide, not less than five per cent of the calcium hydroxide being freshly precipitated, in the presence of arsenious oxide, the mixture being suspended in warm water.

This specification signed this 28th day of April, 1924.

DOMINGO LOPEZ.